(12) United States Patent
Rybalko

(10) Patent No.: US 8,606,866 B2
(45) Date of Patent: Dec. 10, 2013

(54) SYSTEMS AND METHODS OF PROBING DATA TRANSMISSIONS FOR DETECTING SPAM BOTS

(75) Inventor: Roman V. Rybalko, Moscow (RU)

(73) Assignee: Kaspersky Lab Zao, Moscow (RU)

( * ) Notice: Subject to any disclaimer, the term of this patent is extended or adjusted under 35 U.S.C. 154(b) by 287 days.

(21) Appl. No.: 13/024,905

(22) Filed: Feb. 10, 2011

(65) Prior Publication Data

US 2012/0210420 A1  Aug. 16, 2012

(51) Int. Cl.
*G06F 15/16* (2006.01)
(52) U.S. Cl.
USPC ............................................. 709/206; 726/22
(58) Field of Classification Search
USPC ................ 726/22, 24, 26, 20; 709/206
See application file for complete search history.

(56) References Cited

U.S. PATENT DOCUMENTS

| | | | |
|---|---|---|---|
| 6,192,492 B1 | 2/2001 | Masiewicz et al. | |
| 6,321,267 B1 | 11/2001 | Donaldson | |
| 7,107,366 B2 | 9/2006 | Cheng | |
| 7,610,344 B2 | 10/2009 | Mehr et al. | |
| 7,627,543 B2 | 12/2009 | Lock et al. | |
| 2003/0231207 A1* | 12/2003 | Huang | 345/752 |
| 2007/0204341 A1 | 8/2007 | Rand et al. | |
| 2007/0300286 A1* | 12/2007 | Judge | 726/1 |
| 2008/0066179 A1 | 3/2008 | Liu | |
| 2009/0265786 A1 | 10/2009 | Xie et al. | |

FOREIGN PATENT DOCUMENTS

| | | |
|---|---|---|
| EP | 1906620 | 4/2008 |
| JP | 2000215113 | 8/2000 |
| JP | 2004214942 | 7/2004 |
| JP | 2008092523 | 4/2008 |
| WO | WO2008047351 | 4/2008 |

* cited by examiner

*Primary Examiner* — Benjamin R Bruckart
*Assistant Examiner* — Normin Abedin
(74) *Attorney, Agent, or Firm* — Patterson Theunte Pedersen, P.A.

(57) ABSTRACT

A computer-implemented system and method for detecting, by a mail server module, spam bot activity by a client device. An email session is conducted between the mail server module and the client device according to a predetermined protocol that includes exchange of messages between the mail server module and the client device. The mail server module probes compliance with the predetermined protocol including: purposefully introducing at least one irregularity into a first message from the mail server module; monitoring a subsequent message transmission from the client device; comparing the subsequent message against reference criteria; and producing a reputability determination for the client device based on an extent to which the subsequent message was a proper response to the at least one irregularity according to the predetermined protocol, the reputability determination being indicative of a likelihood that the client device conducts spam bot activity.

20 Claims, 6 Drawing Sheets

SYSTEMS AND METHODS OF PROBING DATA TRANSMISSIONS FOR DETECTING SPAM BOTS

FIELD OF THE INVENTION

The invention relates to systems and methods for the real-time analysis of network data transmission and, more particularly, to the identification and neutralization of programs that send unwanted data, or "spam," over network protocols.

BACKGROUND OF THE INVENTION

Every day throughout the world millions of electronic messages (e-mail) are sent over networks such as the Internet, however most of them are unsolicited and unwanted, so-called "spam." Electronic spam has been defined as messages containing commercial, political, and other forms of advertising, as well as malicious programs and links to phishing or other disreputable sites. The most unpleasant part of spam is that it is routinely sent over the Internet to individuals who have not expressed a desire to receive such messages. Additionally, since each typical Internet user receives dozens or even hundreds of spam messages in a given day, statistics indicate that spam accounts for up to 90% of all sent messages. It is clear that the problem of fighting spam is extremely important.

One way to combat spam is to use various filters that allow finding a spam message by one or more keywords or by entering the sender's address in a blacklist. More advanced techniques, such as the use of histograms or categories, also allow users to raise the level of spam detection to values, sometimes approaching 100%. These techniques are currently implemented in commercial products such as Anti Spam Filter, Antispam Post, GFI MailEssentials, Kaspersky Internet Security or Kaspersky Anti-Spam—designed for both individual users and the corporate sector.

These solutions fight spam after it has been sent to a user's e-mail server, and do not solve the main problem itself, that is, the mass e-mailing of spam. These solutions also run the risk of indicating false positives, which means that legitimate email (e.g., from friends or colleagues) can appear as spam if they happen to trigger the filtering mechanisms.

Most spamming is currently performed by individual programs—known as spam bots—which are often covertly installed on users' computers to perform routine operations, such as sending spam. Spam e-mails are transmitted from various servers, which spammers rent for a short time, are not spam's main source, but rather serve for promotional purposes. Thus, one option for fighting spam is to detect spam bots on users' computers. The volume of spam for a home user with a channel bandwidth of 10-20 Mbps can reach up to 50-100 gigabytes of spam a day. Because of the large number of spam bots the aggregate amount of traffic can cause serious strain on email servers. There is therefore a pressing need for effective removal of spam bots from users' computers.

SUMMARY OF THE INVENTION

In view of the above, there is a need to create a system that can identify spam bots by the type of actions they perform and specifics of their implementation, as well as to exploit potential vulnerabilities in their work to further lock and delete spam bots. One aspect of the invention is directed to analyzing a client program's use of and interaction with data transmission protocols at a server. The results of that analysis may be used to recognize, block and remove programs that are sending out spam.

Besides finding spam bots due to their pattern of behavior, another way to detect them is associated with their poor implementation. Spam bots are usually implemented as SMTP clients that attempt to interact with legitimate mail servers. The inventors have recognized that spam bots tend to be poorly optimized and have low-quality algorithms for sending e-mail themselves. This is due to lack of competence on the part of the spam bots' authors, or perhaps because of the perceived lack of need to improve this part of the spam bot, since the main task of the spam bot is sending as much spam as possible in a short period of time.

One embodiment of the invention provides the recognition, blocking, and removing of programs that send spam by analyzing the programs' use of a data transfer protocol to determine the errors in the program's implementation.

A computer-implemented system for detecting spam bot activity according to one embodiment includes computer hardware (including a processor, operating memory, nonvolatile data storage, and communications facilities), a mail server module executable on the computer hardware and adapted to respond to electronic mail requests from a plurality of email clients via the communications facilities according to an email protocol, and a session handler module executable on the computer hardware and adapted to probe a first email client of the plurality of email clients during a communications session between the first email client and the mail server module (that includes message transmissions from the first email client and from the mail server module). The session handler module may be integral to the mail server module, or implemented separately therefrom. The session handler module is adapted to purposefully introduce at least one irregularity into a first message transmission (such as a SMTP reply, for example) from the mail server module during the communications session, and to monitor a subsequent message transmission from the first email client (such as a SMTP request, for example) sent after the first message transmission. The at least one irregularity can be one or more of any variety of irregularities, i.e., non-standard or unusual (under the circumstances) messages or time delays, for example. The subsequent message transmission from the first email client is compared against reference criteria representing a proper response to the at least one irregularity according to the email protocol. Based on the comparison, a first reputability determination is produced for the first email client based on an extent to which the subsequent message transmission from the first email client constituted a proper response to the at least one irregularity. The reputability determination is thus indicative of a likelihood that the first email client conducts spam bot activity.

According to one embodiment, a system to detect spam bots further determines the data transmission protocol used in communications between the client and server, and the type of spam program, using a database of reputability rules. The database of reputability rules is configured to store reputability rules that determine the level of probability that a client program is sending out spam, a way to assess the number of requests associated with a tool for determining the type of the spam program, and a tool for distributing a counter-spam program. While a tool for assessing the number of queries determines the number of similar requests received by the server from other clients and a list of their addresses, the tool for determining the type of program that sends spam is associated with a database of characteristics of the program. The tool for determining the type of the spam program is designed to compare the data obtained from the tool for determining data transfer protocol and from tools to assess the number of requests, for comparison with data from a database of characteristics of the spam program, to identify programs that send spam. The database of the characteristics of the spam program is designed for storing data identifying the spam program. The tool to spread anti-spam program is designed to remove the spam program by sending a "cure" for the spam program, to the client addresses received from the tool for assessing the number of requests.

In one particular implementation the client's reputability is calculated when it triggers a specific set of rules, each of which describes the various implementation errors of data transmission protocol.

A number of advantages will become apparent from the following detailed description of the preferred embodiments.

BRIEF DESCRIPTION OF THE DRAWINGS

The invention may be more completely understood in consideration of the following detailed description of various embodiments of the invention in connection with the accompanying drawings, in which.

Figure 1A:
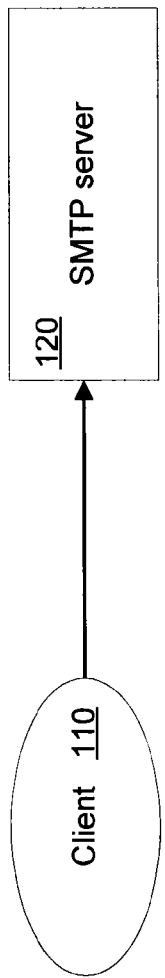
FIGS. 1A-1C depict various arrangements of client-server models in which aspects of the invention may be carried out according to various embodiments.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION OF THE PREFERRED EMBODIMENTS

Every spam bot that is involved with electronic data transmission uses a particular protocol for communicating with mail servers. While the embodiments below are described in the context of the Simple Mail Transfer Protocol (SMTP), it should be understood that principles of the invention could be adapted and applied in other protocols, where such adaptation and application is practicable. Table 1 below is an example of a simple session using this protocol, which is useful for demonstrating the various actions taken by spam bots. In the example SMTP session, the actions taken by the server and client, which is a potential spam bot, are charted progressively as a function of time (with the timeline proceeding downwards).

TABLE 1

| Server | Client (potential spam bot) |
|---|---|
| (listening) | |
| | (Connects to port 25 on server) |
| 220 mail.company.tld ESMTP CommuniGate Pro 5.1.4i is glad to see you! | |
| | HELLO |
| 250 OK | |
| | MAIL FROM: <someusername@somecompany.ru> |
| 250 someusername@somecompany.ru sender accepted | |
| | RCPT TO: <user1@company.tld> |
| 250 user1@company.tld ok | |
| | RCPT TO: <user2@company.tld> |
| 550 user2@company.tld unknown user account | |
| | DATA |
| 354 Enter mail, end with "." on a line by itself | |
| | from: someusername@somecompany.ru to: user1@company.tld subject: Theme Hi! . |
| 250 769947 message accepted for delivery | |
| | QUIT |
| 221 mail.company.tld CommuniGate Pro SMTP closing connection (closes connection) | |

The nature of the SMTP protocol is a dialogue, which is generally one-sided: the client sends a command (i.e., a "request") and the server responds with a "reply."

One aspect of the invention recognizes that there is a way within the SMTP protocol to cause the server to elicit certain behaviors of the client. Based on the presence (or absence) of such behaviors, the server may score the client's level of reputability insofar as spamming is concerned.

In one type of embodiment, the server purposefully introduces irregularities into the communications with the client, such as by supplying non-standard responses to client requests, to which the client may or may not respond appropriately. The server monitors the client's subsequent requests to see if those subsequent requests are somehow responsive to the irregularities. In the monitoring, the content of the subsequent requests, and/or the timing thereof is observed, and compared with reference criteria that represents what is considered to be a correct response to such irregularities according to the SMTP protocol.

One premise of this approach is that a competent implementation of a SMTP client would tend to be able to respond appropriately to such non-standard responses of the server, whereas an incompetent implementation of a SMTP client (such as often the case with spam bots) would not be able to respond appropriately to the server's non-standard responses.

In certain embodiments, mechanisms for identifying defects in client programs are based on delays introduced at times before and during the sending of the server's reply. This type of irregularity in the server's operation is combined with monitoring the timing of the client's responses. A poorly-designed client may fail to accommodate the irregularities, thereby revealing its own deficiencies.

In related embodiments, non-standard operation, or irregularities, of the server are implemented through the issuance of various numerical reply codes from the server. Reply codes are defined in the SMTP standard, RFC-2821, which is incorporated by reference herein. For example, reply codes may take the form of a number ranging from 100 to 999, represented as strings.

As specified in RFC-2821, the three digits of the reply each have a special significance. The first digit denotes whether the response is good, bad or incomplete. An unsophisticated SMTP client, or one that receives an unexpected code, will be able to determine its next action (proceed as planned, redo, retrench, etc.) by examining this first digit. An SMTP client that wants to know approximately what kind of error occurred (e.g., mail system error, command syntax error) may examine the second digit. The third digit and any supplemental information that may be present is reserved for the finest gradation of information.

For example, reply codes categorized by the first digit, include the following categories:
  2xx—command completed successfully
  3xx—more data is expected from client
  4xx—Temporary error, the client must make the next try after some time
  5xx—fatal error Properly developed SMTP clients should correctly handle all reply codes from the server, including codes that are rarely used, and take into account delays (i.e., latency in server responses). Malware creators are generally unconcerned with compliance with standards, which means that the malware that they produce often will fail to perform certain actions in response to particular reply codes. For example, reply codes of the 3xx and 4xx category would generally elicit a retry attempt by a compliant client. Depending on the nature of the reply code, the retry attempt may be appropriately performed quickly, or after some period of delay. A spam bot may ignore such reply codes altogether, or may retry in a manner inconsistent with the reply code, such as retying immediately or incessantly when a delayed retry is most suitable.

Now turning to the figures, FIGS. 1A-1C and 4 depict a set of computer-implemented systems for detecting, and optionally curing or disabling spam bots. The systems, according to embodiments of the present invention, are generally implemented on the server side of a client-server model. Each of the computer-implemented systems can be one physical machine, or can be distributed among multiple physical machines, such as by role or function, or by process thread in the case of a cloud computing distributed model. In various embodiments, aspects of the invention can be configured to run in virtual machines that in turn are executed on one or more physical machines. It will be understood by persons of skill in the art that features of the invention may be realized by a variety of different suitable machine implementations.

In the systems of FIGS. 1A-1C and FIG. 4, various modules are depicted, such as SMTP server 120, SMTP session handler module 130, and client policy module 140, for instance. The term "server" or "module" as used herein means a real-world device, component, or arrangement of components implemented using hardware, such as by an application specific integrated circuit (ASIC) or field-programmable gate array (FPGA), for example, or as a combination of hardware and software, such as by a microprocessor system and a set of instructions to implement the server's or module's functionality, which (while being executed) transform the microprocessor system into a special-purpose device. A module can also be implemented as a combination of the two, with certain functions facilitated by hardware alone, and other functions facilitated by a combination of hardware and software. In certain implementations, at least a portion, and in some cases, all, of a server or module can be executed on the processor(s) of one or more general purpose computers (such as the one described in greater detail below) that execute an operating system, system programs, and application programs, while also implementing the server or module using multitasking, multithreading, distributed (e.g., cloud) processing, or other such techniques. Accordingly, the server or module can be realized in a variety of suitable configurations, and should not be limited to any particular implementation exemplified herein.

Figure 1B:
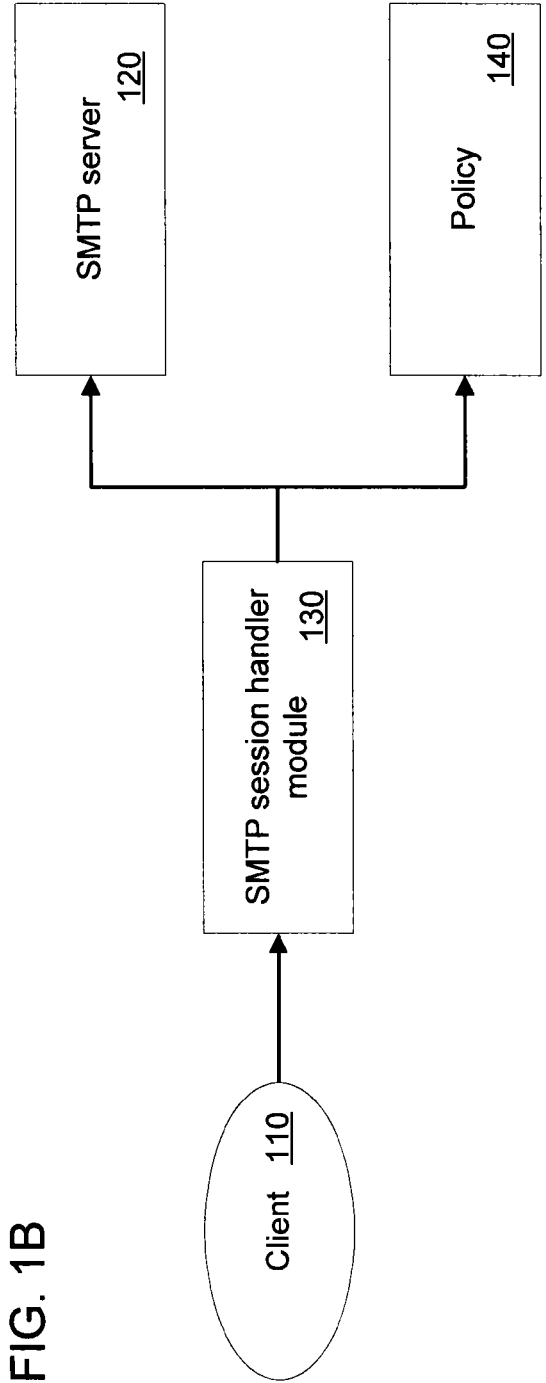
Figure 1C:
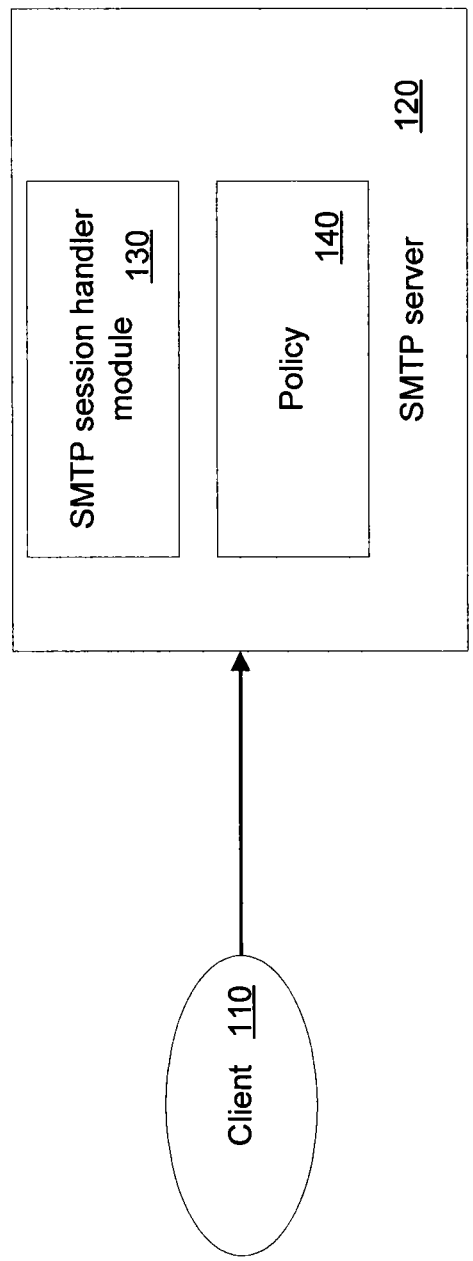

FIGS. 1A-1C illustrate various models for implementing the SMTP protocol. FIG. 1A depicts a typical model of client 110 interacting with SMTP server 120. Under this arrangement, client 110 (also known as a Mail User Agent (MUA), i.e., a program that allows users to send and receive messages on their computer) transmits data to the SMTP server 120 (as a MTA, Mail Transfer Agent, i.e., the program on a server that is responsible for sending mail). As shown by the example of the SMTP session above, the interaction appears as a unilateral dialogue with the client's server where the server merely notifies the client about the status of executed operations.

FIG. 1B depicts an example of a SMTP session handler module according to one embodiment. The session handler module includes a module for tracking the order and timing of interactions in the framework of the SMTP session. SMTP session handler module 130 is located between the client 110 and the SMTP server 120. In addition to handling client 110 requests to the SMTP server 120, SMTP session handler module 130 is also connected to the client policy module 140. Client policy module 140 can include the use of blacklists for IP-addresses, various prohibitions on the transfer of email letters, etc. A policy can be implemented as blocking outgoing email during certain periods of time (this is due to the fact that certain spam bots work during certain hours of the day to avoid detection).

FIG. 1C is a diagram illustrating the SMTP session handler module 130 and client policy module 140 modules as integral sub-parts of SMTP server 120 according to a variation of the embodiment of FIG. 1B above.

Most spam bots begin to upload their data as a bulk load, i.e. not as a messaging server exchange, but rather an immediate data stream. Many servers support the extension of the SMTP pipelining (as specified in RFC 2920) or do not check the order of command sending by the client. This allows spam bots to send a message to the server without performing any reading of the server's response, which simplifies the task of programming illegitimate clients (such as spam bots). Many spam bots behave exactly in this manner. In one embodiment, the SMTP session handler module 130 detects a spam bot by checking the order and timing of commands sent by the client. In one illustrative example, the following checks are performed in the course of issuing a positive response to the client's MAIL command:

0. Client sends MAIL command
  1. Server issues the reply code: 250-OK <CR> <LF>. Since the server provides a multi-line reply code (the hyphen following the numerical reply code indicates that more replies are forthcoming, and each line ends with the symbols <CR> <LF>), a proper response by the client would be to await additional lines before transmitting new commands.
  2. Server monitors the socket with a timeout of 5 sec. If, during this timeout period, data is sent by the client, a critical error is noted and the reputability value for this client is updated to increase the suspicion level for this client. In the case of there being no response from the client during the 5-second timeout period, it is assumed that the client is properly awaiting additional lines of the multi-line reply sequence, and the process continues.

3. Server sends an incomplete reply indicating it is the last line of the multi-line reply (i.e., no hyphen) but without the <LF> character: 250 OK <CR>

4. Server monitors the socket with a timeout of value of 5 sec. If, during this timeout period, data is sent by the client, a critical error is noted and the reputability value for this client is updated to increase the suspicion level (i.e. produce a worse reputability score) for this client. In the case of there being no response from the client during the 5-second timeout period, it is assumed that the client is properly awaiting the final <LF> character, and the process continues.

5. Server sends the final character indicating the end of the multi-line reply: <LF>

6. Server monitors the socket for the next command, with a timeout of 5 sec. If there is no data during this time, a non-critical bug is registered, and the reputability level of the client is updated to only slightly increase the level of suspicion for this client.

In a related embodiment, a SMTP server institutes a series of delays and/or prompts designed to expose poorly-designed SMTP clients that fail to respond appropriately to such delays and/or prompts. These delays and/or prompts may themselves be irregular. For example, in spite of there being a successful receipt of data or request from the SMTP client, the server may nevertheless issue reply code 421 (which indicates that service is not available, and that the server will be closing the transmission channel) but not actually close the channel. Instead, the server waits and monitors whether the client re-sends its data or its request, whether the client disconnects and tries to re-connect, or whether the client ignores the message altogether and continues with transmitting its next request. Based on the response of the client to such fabricated irregularities by the server, the reputability level of the client may be adjusted.

In another related embodiment, the client's reputability may be rehabilitated to some extent when that client successfully responds to certain irregularities.

Figure 2:
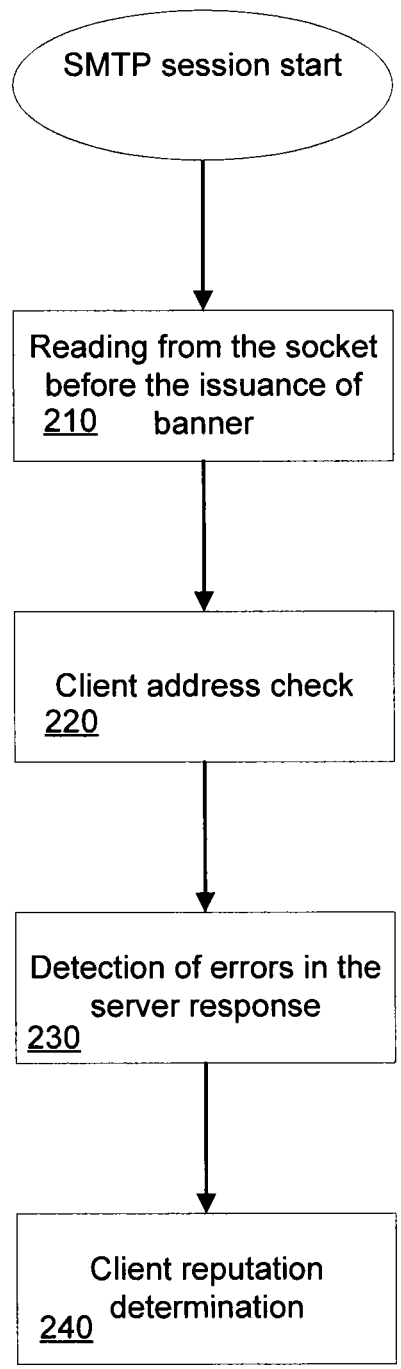
FIG. 2 depicts an example of the interaction of a SMTP session handler with a client according to an embodiment of the invention.

FIG. 2 shows an example algorithm of interaction by the SMTP session handler module 130 with the client 110. At the start of SMTP session stage 210 the server read takes place at the socket connection. The read typically happens before the server will issue a banner. A banner is the response from the server about its willingness to take client commands after the start of session. If the socket has already received the data before the banner is issued, this sequence can indicate an error, and potentially that the client is a spam bot. On the other end of the spectrum, if, after the issuance of a banner, the client did not send data over a specified time—then it could mean that the client is slow, or the server is under a Denial of Service (DoS) attack.

At 220, the client's IP address, or hostname, etc., is checked for the presence of this address in, for example, DUL (Dial Up User List) databases, the presence of which usually indicates that the SMTP session is used to send spam. In the client's response the timeout is also examined, i.e., response time of the client after a given server response.

For instance, it is important while checking the processing of a multi-line response combination, to look for the final line of the response being characters <CR> <LF> (i.e., the transition to a new line). If, after issuance of the line 250-OK <CR> <LF> and reading from the socket with a timeout of 5 seconds any data is obtained, it is regarded as a critical error. Such an assessment is carried out along with other similar actions at stage 230. As data is collected on the defects of the client's responses to non-standard actions by the server, the level of negative reputability for the client is increased, which characterizes it as a potential spam bot.

Reputability of the client is calculated at block 240 when a specific set of rules is triggered, each of which describes the various implementation errors of data transmission protocol. Table 2 below illustrates an example of an implementation for the SMTP protocol.

TABLE 2

| Reputability Level | Parameter | Response Value | Parameter Lifetime |
|---|---|---|---|
| Critical | Transfer of Client Data | Before banner | 1 month |
| Non-Critical | No Client command received | 5 seconds before the issuance of banner | 1 week |
| Critical | Client Data received | Lack of data | 1 month |

Each rule is characterized by its own assessment or the level of reputability. In this example, the level of reputability can be indicated by categorizations such as "critical", "non-critical", etc. Assessments can also be expressed numerically (e.g., calculated security ratings as described in U.S. Pat. No. 7,530,106 to Zaitsev et al., the disclosure of which is incorporated by reference herein). Additionally, the lifetime characterizes the duration of the effectiveness of the triggered reputability rules. Thus, each client has a reputability level that characterizes the client as a potential spam bot, and which varies with time, thus avoiding possible false positives.

Figure 3:
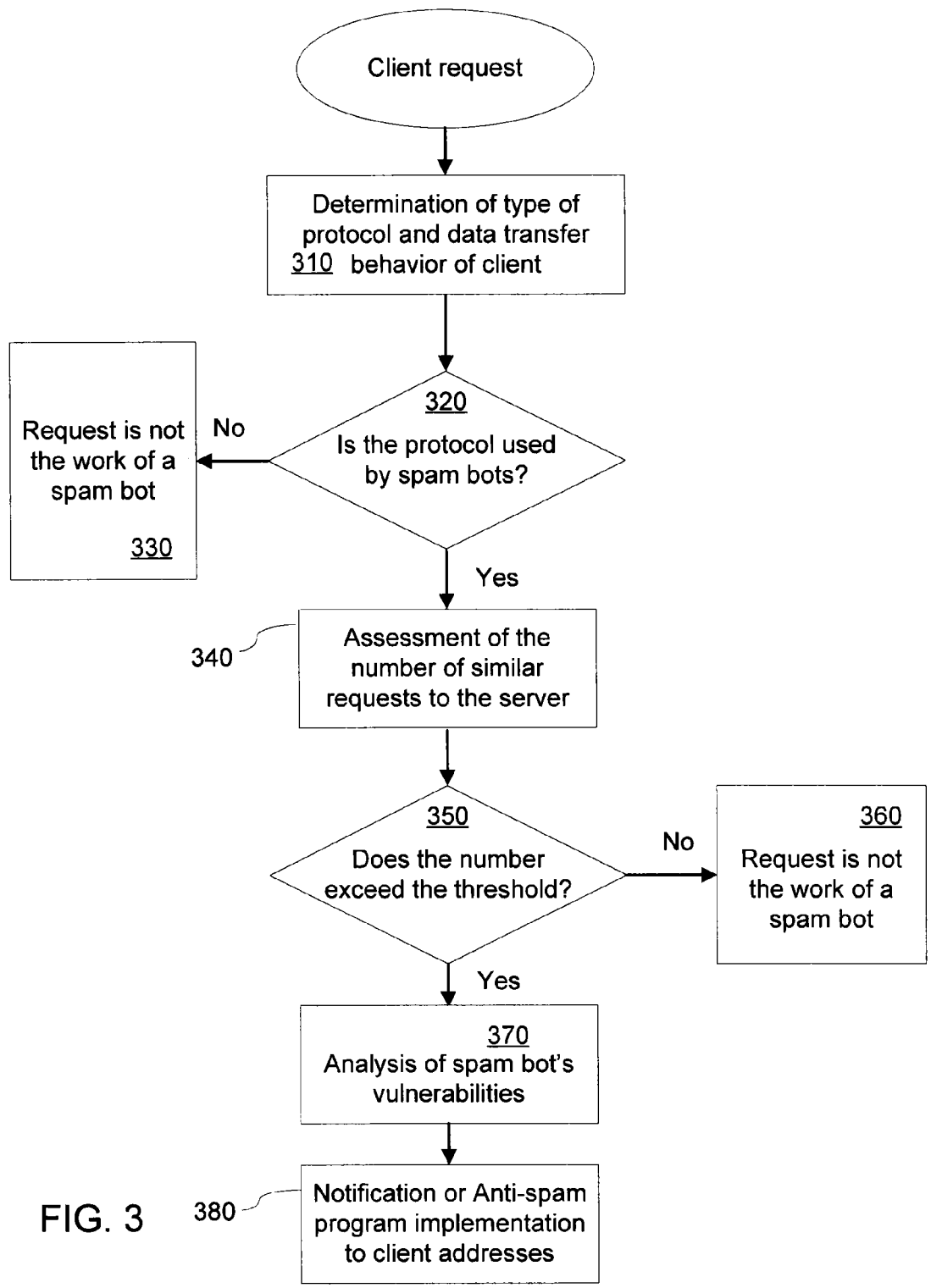
FIG. 3 depicts an example of the operation of a spam bot detection system according to an embodiment of the invention.

FIG. 3 depicts an example process according to one embodiment of the present invention. After receiving a request from the client, block 310 determines the type of protocol used (e.g., TCP, SSL, IP, etc.) and the of the data transmission behavior of the client. Examples of data transmission behavior of the client include the time it takes for the client to respond to the server's reply, and whether the client correctly responds to any purposefully-introduced irregularities in the server's reply.

An example of the operation of block 310 is depicted in FIG. 2 (shown in the context of data transmission using the SMTP protocol and the subsequent determination of reputability for the client 110). In this block, the server takes steps to try to elicit errors by the client. These errors can fall into one of two categories: (1) Critical errors, meaning further work with the client is not possible or does not make sense (e.g., disconnection, a fatal error transport protocol error such as a SSL error; and (2) a common error, which results from certain actions or inactions by the client, and which does not prevent further interaction with the client.

Next, in block 320 a check is performed to see if the detected protocol used by the client is associated with spam bots. A negative response in block 330 allows conclusion that the request is not the work of a spam bot. Otherwise, in block 340 the number of similar requests from the client to the server is analyzed. Similar requests in one example can include email messages to various recipients having similar message body contents. Then, in block 350 a check of the number of requests is performed and if it does not exceed a predetermined threshold, then in block 360 the system can conclude that the request is not the work of a spam bot.

Otherwise, if the process reaches block 370, the system is at a stage in which the client's request has characteristics, or the client has a reputability level that is consistent with that of spam bots (determined at block 310), the communications protocol is consistent with protocols known to be used by spam bots (determined at block 320), and the number of requests from the client to the server is large enough to suggest that the client may be a spam bot (determined at block 340). In aggregate, these evaluations indicate that the request (s) to the server is the work of a spam bot.

At block 370 the observed characteristics of the client are collected and compared against characteristics of specific known spam bot types in order to identify the particular spam bot suspected of being implemented by the client. If the specific spam bot can be identified (or newly characterized), its vulnerabilities may be already known or, in the case where the spam bot presents a novel type, its vulnerabilities may be determined for the purpose of developing a specific treatment package for that spam bot. Also at block 370, a log is updated to associate the suspected spam bot type with the client (e.g., with the client's email or IP address, host name, domain, etc.) Finally, at block 380 a notification or treatment is sent out to all client addresses that exhibited the same or sufficiently similar behavior to the analyzed client.

In one example, the notification indicates that the client is under the control of a spam bot, which may be useful to the email owner (or system administrator) for applying corrective action. A variety of approaches are contemplated for delivering and applying treatment packages. In one example, applicable to client computer systems that utilize a malware removal tool, the service of the malware removal tool may be notified regarding the discovered spam bot type, and a malware removal tool update can be disseminated which includes instructions for removing the spam bot. In another example, a custom spam bot removal program may be adapted specifically for the discovered or detected type of spam bot. This custom spam bot removal program can be issued to all client addresses logged at block 370 as having exhibited the same or similar behavior as the analyzed client. In yet another treatment example, analysis of the spam bot may have revealed a vulnerability that could be exploited (e.g., using buffer overrun techniques, or other known or to-be-determined exploits), and the server can perform operations to employ those exploits against the spam bot.

Figure 4:
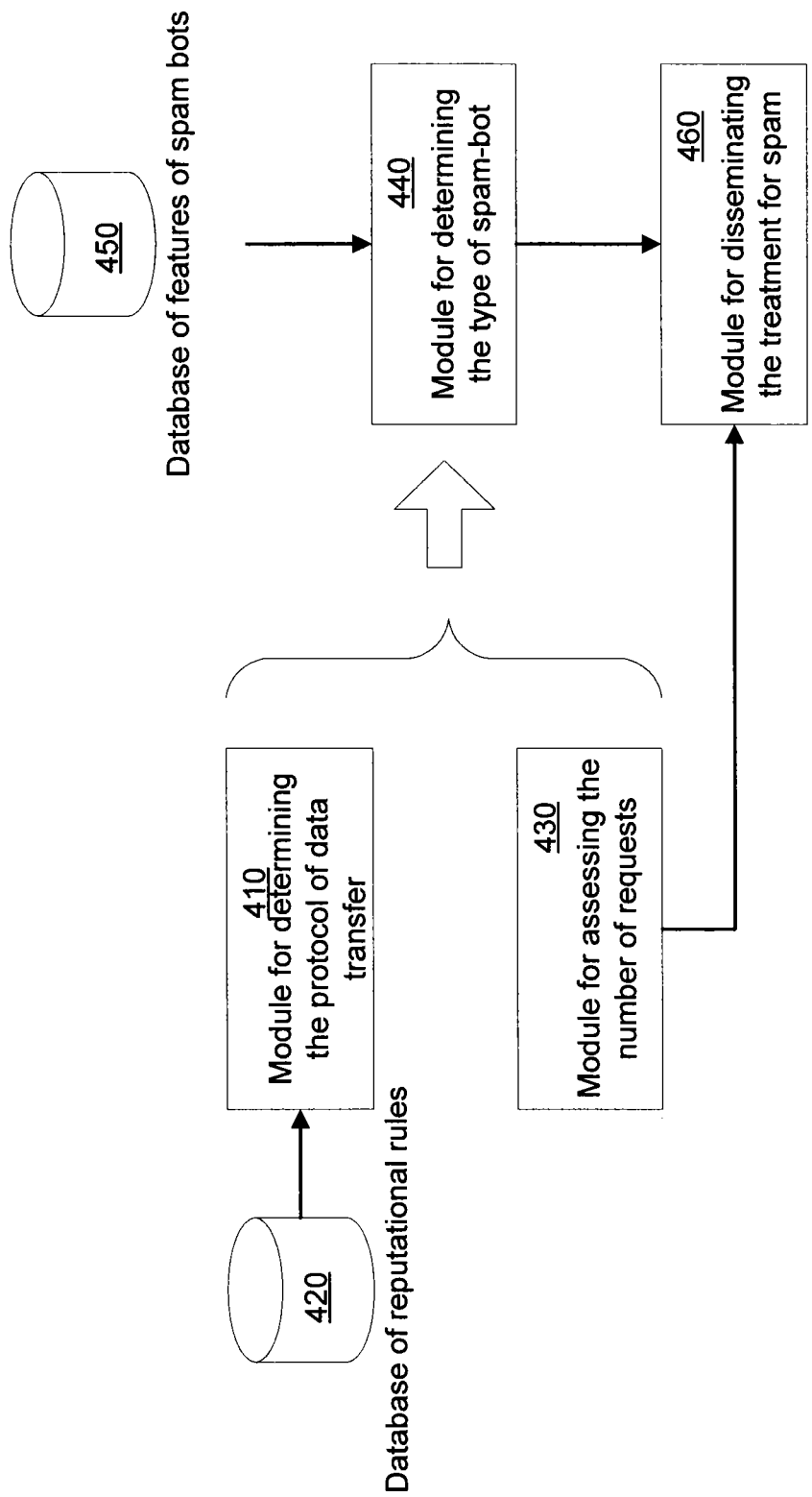
FIG. 4 illustrates an exemplary system that implements anti-spam bot treatment according to one embodiment of the present invention.

FIG. 4 illustrates an exemplary system that implements anti-spam bot treatment according to one embodiment of the present invention. Tool 410 determines the type of data transfer protocol used and the particular data, assessing the level of reputability with the help of the database 420 of reputability rules. In addition, tool 430 evaluates the number of similar queries from other clients. By combining the information received from both sources, tool 440 determines the type of spam bot and compares this information with data stored in a database 450 of features of spam bots. After the spam bot is successfully defined, the anti-bot tool 460 sends a treatment to the addresses that sent the queries similar to those analyzed, or institutes other corrective actions such as those described above.

Figure 5:
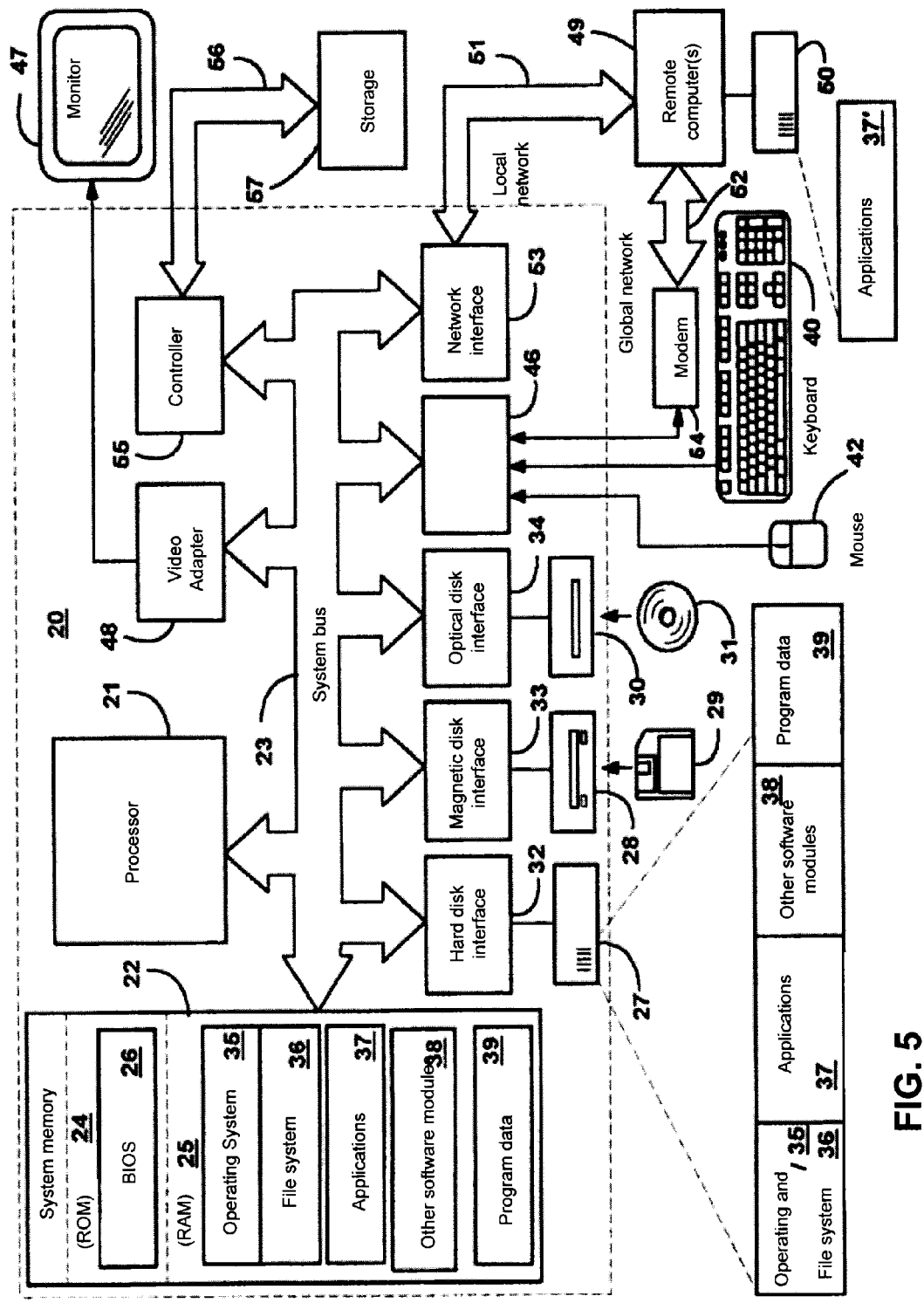
FIG. 5 depicts an exemplary computer system on which embodiments of the invention may be implemented.

FIG. 5 is an example of a general-purpose computer system on which various embodiments of the spam bot detector of the present invention may be implemented. Personal computer or server 20 contains a CPU 21, system memory 22 and system bus 23, which contains various system components, including memory associated with CPU 21. The system bus 23 is implemented as any known in bus structure, including a bus memory, bus memory controller, peripheral bus and local bus, which can interact with any other bus architecture. System memory includes read only memory (ROM) 24, and random access memory (RAM) 25. Basic input/output system (BIOS), containing the main procedures that ensure the transfer of information between the elements of the personal computer 20, for example, at boot time using the ROM 24.

The personal computer 20 contains a hard drive 27 for reading and writing, magnetic disk drive 28 for reading and writing to removable magnetic disk 29 and an optical drive 30 for reading and writing to removable optical disk 31, such as CD-ROM, DVD-ROM or other optical media. The hard disk drive 27, magnetic disk drive 28, optical drive 30 are all connected to the system bus 23 via the hard disk interface 32, magnetic disk drive interface 33 and an optical drive interface 34, respectively. Drives and the corresponding computer storage media are non-volatile storage means of computer instructions, data structures, program modules and other data of a personal computer 20. This description reveals the implementation of a system, which uses a hard disk, removable magnetic disk 29 and a removable optical disk 31, but it should be understood that the use of other types of computer storage media that can store data in computer readable form (cassette tape, flash drive or other nonvolatile memory, digital disks, Bernoulli cartridges, random-access memory (RAM), read-only memories (ROM), etc.) is possible.

Some of the software modules, amongst which may be an operating system 35, are stored on a hard disk, magnetic disk 29, optical disk 31, ROM 24 or RAM 25. A computer 20 has a file system 36, which stores the operating system 35 and additional software applications 37, other program modules 38 and program data 39. The user has the ability to enter commands and information into a personal computer 20 through input devices (keyboard 40, Mouse 42). Other input devices may be (not shown): microphone, joystick, game console, satellite dish, scanner, etc. Such an input device are usually connected to the CPU 21 through a serial port 46, which in turn is connected to the system bus, but may be connected by other means, such as a parallel port, game port or universal serial bus (USB). A monitor 47 or other type of display device is also connected to the system bus 23 via an interface such as a video adapter 48. In addition to the monitor 47, personal computer can be equipped with other peripheral output devices (not shown), such as speakers and printer, etc.

A personal computer 20 can operate in a networked environment, using a logical connection to one other, or more remote computers 49. A remote computer (or computers) 49 is/are the same as personal computers, servers, routers, network stations, peering devices or another network node, and usually, have most or all of the elements previously described in the description of the substance of a personal computer 20, shown in FIG. 5, but only as a storage device 50 with applications 37. Logical connections imply a local area network (LAN) 51 and wide area network (WAN) 52, Such networks are common office equipment, and are also used in corporate computer networks, company intranets and the Internet.

When using LAN networks, a personal computer 20 is connected to LAN 51 via a network adapter or interface 53. When using the WAN networking, personal computer 20 has a modem 54 or other means of communication with the global computer network 52, such as the Internet. A modem 54, which may be internal or external, is connected to the system bus 23 via a serial port 46. In a networked environment software modules of exposed personal computers 20, or parts of such programs, are stored in remote storage devices. It should be pointed out that the network connections are merely illustrative and are not required to display the exact network configuration, network, i.e., in fact, there are other ways of establishing a logical connection, other technical means of communication of one computer to another.

The embodiments above are intended to be illustrative and not limiting. Additional embodiments are within the claims. In addition, although aspects of the present invention have been described with reference to particular embodiments, those skilled in the art will recognize that changes can be made in form and detail without departing from the spirit and scope of the invention, as defined by the claims. For instance, the principle of purposefully introducing irregularities into the server's replies to client requests, may be applied in other, non-SMTP, protocols in which the server may be requesting a reply from the client (in which case the irregularity would be introduced into the server's request, and the client's reply to that request would be monitored).

Persons of ordinary skill in the relevant arts will recognize that the invention may comprise fewer features than illustrated in any individual embodiment described above. The embodiments described herein are not meant to be an exhaustive presentation of the ways in which the various features of the invention may be combined. Accordingly, the embodiments are not mutually exclusive combinations of features; rather, the invention may comprise a combination of different individual features selected from different individual embodiments, as understood by persons of ordinary skill in the art.

Any incorporation by reference of documents above is limited such that no subject matter is incorporated that is contrary to the explicit disclosure herein. Any incorporation by reference of documents above is further limited such that no claims that are included in the documents are incorporated by reference into the claims of the present Application. The claims of any of the documents are, however, incorporated as part of the disclosure herein, unless specifically excluded. Any incorporation by reference of documents above is yet further limited such that any definitions provided in the documents are not incorporated by reference herein unless expressly included herein.

For purposes of interpreting the claims for the present invention, it is expressly intended that the provisions of Section 112, sixth paragraph of 35 U.S.C. are not to be invoked unless the specific terms "means for" or "step for" are recited in a claim.

What is claimed is:

1. A computer-implemented system for detecting spam bot activity, comprising:
    computer hardware, including a processor, operating memory, nonvolatile data storage, and communications facilities;
    a mail server module executable on the computer hardware and adapted to respond to electronic mail requests from a plurality of email clients via the communications facilities according to an email protocol that defines proper responses to commands or events, wherein in practice certain commands or events are relatively more common and certain commands or events are relatively less common;
    a session handler module executable on the computer hardware and adapted to probe a first email client of the plurality of email clients during a communications session between the first email client and the mail server module that includes message transmissions from the first email client and from the mail server module, wherein the session handler module is further adapted to:
    purposefully introduce at least one irregularity into a first message transmission from the mail server module during the communications session, and to monitor a subsequent message transmission from the first email client sent after the first message transmission, wherein the at least one irregularity represents a command or event to which the email protocol defines a proper response, and that is selected from among those certain commands or events that are relatively less common;
    compare the subsequent message transmission against reference criteria, the reference criteria representing a proper response to the at least one irregularity according to the email protocol; and
    produce a first reputability determination for the first email client based on an extent to which the subsequent message transmission from the first email client constituted a proper response to the at least one irregularity, the reputability determination being indicative of a likelihood that the first email client conducts spam bot activity.

2. The system of claim 1, wherein the email protocol is the SMTP protocol and wherein the mail server module is a SMTP server.

3. The system of claim 1, wherein the at least one irregularity includes a time delay.

4. The system of claim 1, wherein the proper response to the at least one irregularity includes delaying transmission by the first email client.

5. The system of claim 1, wherein the at least one irregularity includes a SMTP reply code indicating an error.

6. The system of claim 1, wherein the at least one irregularity includes a SMTP reply code indicating that a reply includes a multiple lines.

7. The system of claim 1, wherein the at least one irregularity is an incomplete message.

8. The system of claim 1, wherein the session handler module is further adapted to set the first reputability determination of the first email client based on a determination of a type of protocol used by the first email client.

9. The system of claim 1, wherein the session handler module is further adapted to set the first reputability determination of the first email client based on a determination of a type of error produced by the first email client in response to the at least one irregularity.

10. The system of claim 1, wherein the session handler module is further adapted to set the first reputability determination of the first email client based on a determination of a quantity of similar emails sent by the first email client.

11. The system of claim 1, wherein the session handler module is further adapted to issue notification or corrective action to the first email client based on the first reputability determination.

12. The system of claim 1, wherein the session handler module is further adapted to issue notification or corrective action to at least one email client other than the first email client based on the first reputability determination.

13. A computer-implemented method for detecting, by a mail server module,
    spam bot activity by a client device, the method comprising:
    conducting, by the mail server module, an email session with a client device, the email session being conducted according to a predetermined protocol and including exchange of messages between the mail server module and the client device, wherein the protocol defines proper responses to commands or events, wherein in practice certain commands or events are relatively more common and certain commands or events are relatively less common; and
    probing, by the mail server module, compliance with the predetermined protocol by the client device, including:
    purposefully introducing at least one irregularity into a first message from the mail server module, wherein the at least one irregularity represents a command or event to which the protocol defines a proper response, and that is selected from among those certain commands or events that are relatively less common;
    monitoring a subsequent message transmission from the client device, the subsequent message being sent after the first message;

comparing the subsequent message against reference criteria, the reference criteria representing a proper response to the at least one irregularity according to the predetermined protocol; and producing a reputability determination for the client device based on an extent to which the subsequent message was a proper response to the at least one irregularity according to the predetermined protocol, the reputability determination being indicative of a likelihood that the client device conducts spam bot activity.

14. The method of claim 13, wherein conducting the email session according to a predetermined protocol includes conducting the email session according to the SMTP protocol.

15. The method of claim 13, wherein introducing the at least one irregularity includes introducing a time delay.

16. The method of claim 13, wherein introducing the at least one irregularity includes introducing a false indicator of an error occurring at the mail server module.

17. The method of claim 13, wherein introducing the at least one irregularity includes introducing an irregularity for which a proper response is a time delay by the client device.

18. The method of claim 13, wherein introducing the at least one irregularity includes sending an incomplete message.

19. The method of claim 13, further comprising setting the reputability determination based on at least one additional parameter of the client device's behavior during the email session.

20. The method of claim 13, further comprising issuing a notification or corrective action to at least one client device based on the reputability determination.

* * * * *